Nov. 7, 1950 J. B. WADHAMS 2,528,714

HIGH-FREQUENCY INDUCTOR BLOCK

Original Filed Jan. 24, 1944

INVENTOR.
JAMES B. WADHAMS
BY Alfred C. Body
ATTORNEYS

Patented Nov. 7, 1950

2,528,714

UNITED STATES PATENT OFFICE 2,528,714

HIGH-FREQUENCY INDUCTOR BLOCK

James B. Wadhams, Cleveland, Ohio, assignor to The Ohio Crankshaft Company, Cleveland, Ohio, a corporation of Ohio Continuation of application Serial No. 519,559, January 24, 1944. This application October 22, 1949, Serial No. 122,915

8 Claims. (Cl. 219—47)

This invention relates to inductors for high-frequency induction heating and, more particularly, to an inductor and a method for increasing the input impedance of the inductor on the power source and controlling the loading of the inductor when coupled with its workpiece on the power source.

The present application is a continuation of my copending application, Serial No. 519,559, filed January 24, 1944, now abandoned.

In the field of high-frequency induction heating, it is conventional to employ an inductor formed from a slab of high-conductivity material, such as copper, having a workpiece-receiving bore or opening extending from one side to the other. A slot extends from the bore to the edge of the slab, providing on each side of it a pair of parallel, close-spaced, "fish-tail" leads which are connected to a suitable source of high-frequency electric power. Such sources may consist of rotary-type, high-frequency generators or electronic-type power sources.

Alternatively, the inductor may comprise a length of a conductive material shaped into a loop to form the workpiece-receiving opening and with the ends extending away from the loop in close-spaced parallel relationship.

High-frequency electric currents from the power source, whichever type may be employed, circulate down the leads of the inductor and around the workpiece opening, inducing concentrated, high-frequency currents to flow peripherally around the portion of the workpiece within the opening, which currents heat the portion very rapidly to a desired elevated temperature.

The axial width of the workpiece in which the concentrated currents flow is primarily a function of the ratio of the workpiece-opening diameter to the workpiece diameter and the thickness of the inductor or, in other words, the axial length of the workpiece opening.

As the ratio of the workpiece-opening diameter and workpiece is increased, the width of the pattern on the workpiece is increased and vice versa. If the length of the workpiece opening is increased, the width of the heat pattern on the workpiece also increases and vice versa.

These same factors also have a direct effect on the input impedance of the inductor and of the loading of the inductor with the workpiece in position on the power source.

If the ratio of the workpiece-opening diameter to the workpiece diameter is increased, the loading decreases and vice versa. If the thickness of the block or the length of the workpiece opening is increased, the input impedance goes down and the loading of the inductor on the power source increases and vice versa.

Oftentimes, the ratio of the workpiece-opening diameter to the workpiece diameter and the axial length of the workpiece opening are predetermined for one reason or another such as the necessary or required width of heat pattern. Other times, the inductor block is constructed in accordance with a predetermined design and it is later found that the input impedance of the inductor is too low so that the power source is overloaded. Prior to this invention, complete reconstruction of the inductor was required in order to vary the input impedance, or compromises in the heat pattern were necessary.

Inductors of this type are normally always connected to their power source through an impedance-matching device or transformer and, in some cases, the effects of this overloading or low input impedance of the inductor can be corrected by changing or increasing the impedance ratio of the matching transformer. However, at times, changing the impedance ratio of the transformer is not feasible. In some cases, where a fixed ratio transformer is already installed, a new transformer with a different ratio is required, thus obsoleting the old transformer. In other cases, it is not feasible or electrically efficient to obtain a greater ratio of impedance transformation. This is particularly true with electronic-type power sources which have an internal impedance on the order of a thousand ohms or more. Matching such a power source to the extremely low impedance of a properly loaded inductor is exceedingly difficult and sometimes cannot be done even though a single-turn secondary transformer is employed.

Another difficulty has been where a pair of inductors are employed which are to be electrically connected either in parallel or in series with the same power source. Here the inductors, even though of identical dimensions, may have different input impedances and will not draw the same amount of power from the power source.

The present invention contemplates an inductor construction and method for individually enabling adjustment of the input impedance of a high-frequency inductor whereby the above referred to difficulties will be alleviated. The invention contemplates an inductor having a workpiece-receiving opening and a pair of parallel, close-spaced, fish-tail leads which are adapted to connect to a power source so that high-frequency currents may be flowed around the opening. However, the opposing surface or surfaces of one or both of the fish-tail leads is recessed to increase the input impedance of the inductor and decrease its loading on the power source or to enable matching of its impedance through conventional transformer arrangements to an electronic power source. To enable the recess to be formed, the opposing surfaces of the fish-tail leads are formed of a sufficient thickness of material.

The invention also contemplates a method of heating with high frequency currents which comprises flowing high-frequency currents from a high-frequency power source in close-spaced parallel relationship, then in substantial-spaced relationship about an area void of electrically-conductive material, then in close-spaced relationship and then in a loop around a space substantially filled with a workpiece to be heated whereby to induce heating currents in the workpiece.

The inductor block may be made more or less hollow and the wall of the block defining the workpiece-receiving opening may be provided with a plurality of openings communicating with the hollow interior of the block and quench water may be projected through these openings onto the heated workpiece. However, the recess formed in the walls of the fish-tail leads are impervious and do not have openings communicating with the interior of the block, the purpose being so that quench water will not flow into the recess and be wasted during the quenching operation.

The invention also contemplates an inductor having a control opening in the leads with means for varying its area.

The principal object of the present invention is to provide an inductor having means for regulating its loading on a power circuit other than varying the dimensions of the workpiece-receiving opening.

Another object of the invention is to provide an inductor block of the quench-through-the-block type having a recess in the opposed surfaces of the fish-tail leads to increase the input impedance of the inductor on a power source.

Still a further object is to provide a high-frequency inductor of the quench-through-the-block type which may have the workpiece-receiving opening constructed to the optimum dimensions for the desired heating of a workpiece and still effect a desired loading on a power source.

Another object has been to provide a simple means for controlling the input load impedance and, thus, the loading of an inductor on a power source so that heating of a workpiece can be obtained in the shortest possible time and with the least power from the source.

The invention will be specifically set forth and defined in the appended claims. The invention, of course, may take physical form in a number of different-appearing embodiments and preferred embodiments of the invention will be described in detail in this specification and illustrated somewhat diagrammatically in the accompanying drawings which form a part of this specification, and wherein:

Figure 1:
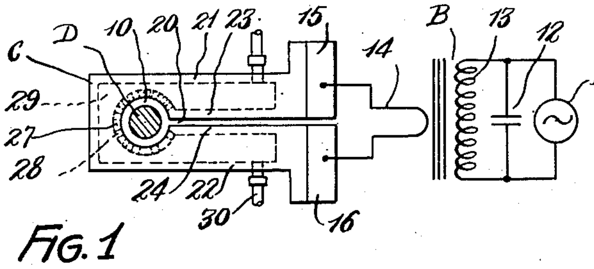
Figure 1 shows a conventional induction-heating circuit, including a power source, an impedance-matching transformer and a high-frequency inductor of the quench-through-the-block type.

Referring now to the drawings, Figure 1 shows a conventional high-frequency, induction-heating arrangement and is shown for the purpose of more clearly illustrating the present invention. In Figure 1, there is shown a high-frequency power source A, an impedance-matching transformer B and an inductor block C electrically connected for the purpose of heating a workpiece D.

The power source A may be of any conventional type capable of supplying high-frequency, high-voltage, electric power such as a rotating generator or an electronic-valve, high frequency oscillator.

The inductor block C is provided with a workpiece-receiving opening 10 and the workpiece D is shown in cross section positioned in this opening.

The block C has a longitudinal slot 20 communicating with the workpiece opening 10 and dividing the block on one side of the opening into a pair of fish-tail leads 21, 22. The slot 20 is defined by close-spaced, parallel sides 23, 24 of the leads 21, 22 respectively. The workpiece-receiving opening is defined by a wall 27. This wall is provided with a plurality of openings 28 which communicate with a hollow interior 29 of the inductor block. Water is circulated into the hollow interior 29 under pressure through suitable water connections 20 and is ejected through the openings 28 at high velocities onto the heated surfaces of the workpiece D to rapidly cool the workpiece after it has been heated by the high-frequency currents. This quench arrangement is more clearly disclosed in the patent to Denneen, et al., No. 2,170,130 dated August 22, 1939.

A condenser 12 is also shown connected in parallel with the power source A, the purpose of which is to adjust the power-factor demand on the power source A if a rotating-type generator is employed, or to adjust the frequency of the power source if an electronic power source is employed. In the latter event, the primary coil 13 of the transformer B may be employed as the oscillatory tank circuit of the electronic power source. As shown, the transformer B generally has a one-turn secondary so that its impedance transformation ratio depends primarily on the number of turns in the primary 13 of the transformer itself. The secondary 14 connects to a pair of terminal blocks 15, 16 to which the inductor C may be connected and, in many instances, supported in the heating position.

The above description is of more or less conventional apparatus as used in the high-frequency, induction-heating art. In some instances, auxiliary cooling passages may be provided in the inductor block; but, as shown here, the quench water also serves to cool the block from any heat generated by the high current flowing therein. With the block as shown in Figure 1, there is only one way of increasing the input impedance of the inductor block so that the loading on the power source may be decreased; that is, without varying the impedance ratio of the transformer B. This may be done only by decreasing the length of the work-piece opening or in increasing the diameter of the workpiece opening, or both. As previously stated, varying the dimensions of the workpiece opening may adversely affect the heat pattern in the workpiece D. This is particularly so where a very narrow heat pattern is desired. Also, if the inductor has been carefully designed, there is generally insufficient metal about the opening to permit changing the dimensions to any appreciable extent.

The present invention provides a means for increasing the input impedance of an inductor block without in any way altering the shape of the workpiece-receiving opening. Thus, as shown in Figure 2, the walls 23', 24' forming the slot 20 are made to have an appreciable thickness in a direction laterally away from the slot 20.

Figure 2:
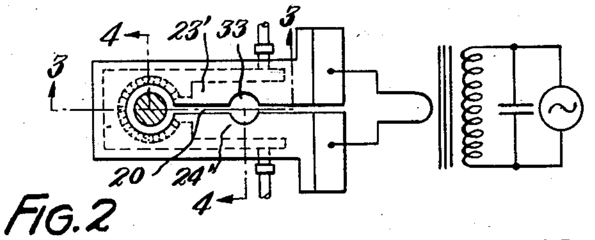
Figure 2 is a view similar to Figure 1 but with the present invention applied thereto.

In the embodiment shown in Figure 2, the walls 23' and 24' are each provided with oppositely disposed, semicircular openings which, in conjunction, form an input impedance control opening 33. Dependent upon the dimensions of the opening selected, the input impedance of the inductor block may be adjusted to any desired value. As shown, the walls defining the opening are impervious to the interior of the inductor block so that no quench water will flow therethrough while the workpiece D and the workpiece opening 10 are being quenched. Also, the opening 33 should preferably be kept clear of electrically-conductive material in order that its effect of an increase in the input impedance of the inductor block will be a maximum. In some instances, if the hole is made too large, it is possible that such material may be placed in the opening 33 to decrease the effect of the opening.

While the opening 33 is shown as circular, it need not be and may take any other form, such as rectangular, or there may be a plurality of such openings provided. Also, the recesses need not be oppositely disposed or only one need be provided.

Figure 4:
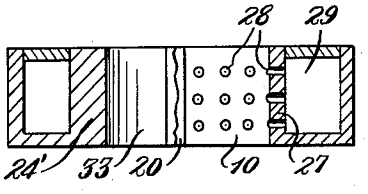
Figure 4 is a cross-sectional view of Figure 2 taken approximately on the line 4—4 but without the workpiece in position.
Figure 3:
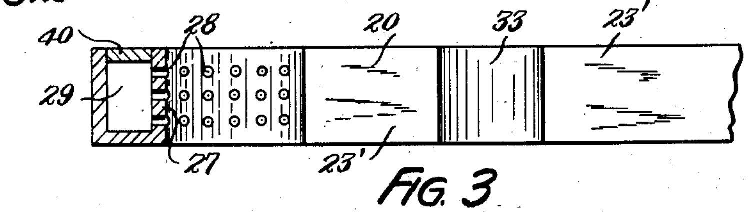
Figure 3 is a view of Figure 2 taken approximately on the line 3—3 thereof but without the workpiece in position.

The inductor shown in Figure 2 is shown in greater detail in Figures 3 and 4. It will be appreciated that if a solid block of copper is provided from which the inductor is made, the formation of the interior passage 29 may involve some difficulty. Figure 3 shows one way in which this may be accomplished. The interior 29 is milled out in a conventional manner and a cover 40 of the shape to fit over the milled opening 29 is provided, this cover 40 being soldered or brazed in position. Obviously, the hollow interior could be provided by drilling or any other known means.

Figure 5:
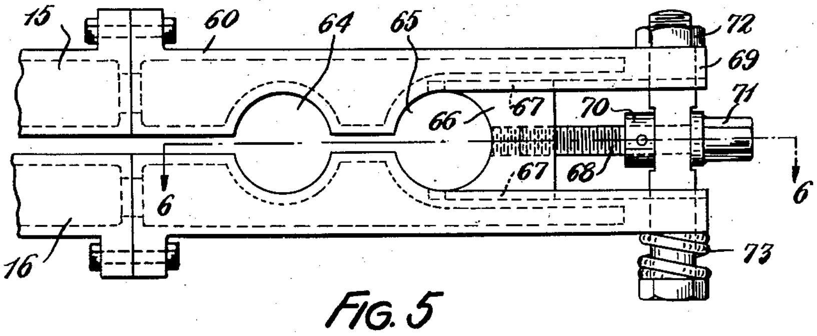
Figure 5 is an elevational view of an inductor block showing a modified embodiment of the invention wherein means are provided for adjusting the area of the input impedance adjusting opening.
Figure 6:
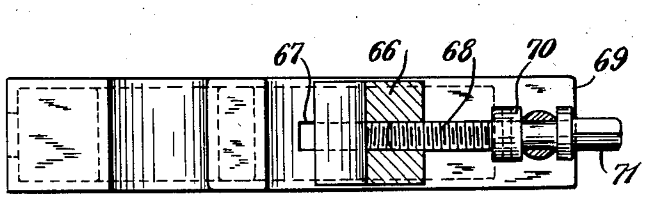
Figure 6 is a sectional view of an inductor taken approximately on the line 6—6 of Figure 5.
Figure 7:
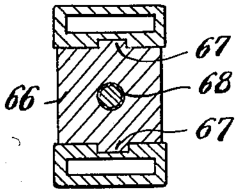
Figure 7 is a sectional view taken approximately on the line 7—7 of Figure 5.

Since a large number of inductors of the forms of Figures 1, 2 and 3 would otherwise be required to correctly heat a large variety of sizes of articles, an adjustable inductor has been provided by the present invention which is illustrated in Figures 5 through 7. As pointed out hereinbefore, the form of the unloaded opening in the inductor is not of great importance, rectangular openings being substantially as satisfactory as cylindrical bored holes. In the inductor of Figures 5 through 7, a modified rectangular form of passage has been provided since this form lends itself better to adjustability. This inductor comprises two halves or legs 60 and 61 which are adapted to be attached to terminals 15 and 16 of the transformer B. The inductor is provided with two openings, opening 64 ordinarily being a bore of suitable diameter to receive the part to be heated. The other opening 65 ordinarily is for the purpose of permitting the desired ratios of work diameter to bore diameter and bore diameter to bore length while still having the correct input impedance for the desired power. In selecting an inductor, one having the correct bore is usually available, but the dimension ratios of such an inductor may be very unfavorable to efficient loading. To provide the desired loading, opening 65 is provided and this opening is made adjustable in area.

To accomplish the adjustability of opening 65, the inductor members 60 and 61 are cut away to provide an elongated space between them. A block of conducting metal 66 is inserted in the open end of this elongated space to bridge this space and to provide a continuous conducting peripheral wall for opening 65. The opposite faces of the space are provided with longitudinal grooves 67 to receive guide elements on block 66 to guide the block when it is moved longitudinally of the space to vary the size of opening 65. The movement of the block is accomplished by screw 68 which threadedly engages the block. This screw is held axially by clamp belt 69 through which it passes. Collar 70 and head 71 of the screw engage opposite sides of the bolt to prevent axial movement. When it is desired to change opening 65, the nut 72 of clamp bolt 69 is loosened to release pressure on the opposite sides of block 66 and screw 68 is turned to bring this block to a desired new location after which nut 72 is tightened to insure good current-conducting contact between the block and the inductor members.

By providing spring 73, the pressure exerted on block 66 by the members 60 and 61 is such as to permit this block to be moved along these members while maintaining current-conducting contact therewith, thus eliminating the necessity of loosening nut 72. For convenience, a scale may be provided along a face of one of the inductor members, cooperating with a line scribed on block 66. This scale may be calibrated to read in any desired units such as input impedance for a given condition of loading.

It will be observed that by the form of the inductor members 60 and 61 and by the form of block 66, the form of opening 65 is established and that, for certain operations, this opening can be employed to receive the workpiece to be heated while bore 64 is employed to match the inductor to the work. Members 62 and 63 are so supported as to permit of such movement of members 60 and 61 as is necessary for the movement of block 66.

The opening 65 is shown remote from the power source. It could be positioned otherwise than as shown. The walls defining the workpiece opening 64 are shown as imperforate. They could be provided with quench openings, if desired.

In constructing an inductor block of the type shown in Figures 1 to 3, the thickness of the block is chosen to correspond to the desired length of the workpiece opening 10 so as to produce the desired width of heat pattern when taken into consideration with the diameter of the opening in relation to the diameter of the workpiece to be heated. The method of determining the size of this hole is well known to those skilled in the art and will not be further detailed here. Suffice it to say that when the dimensions of the opening are chosen and the inductor block is connected to a power source as shown in Figure 1 and the workpiece placed in the opening 10, the input impedance of the inductor block will oftentimes be so low that it is impossible to properly match the inductor and its load to the power source with conventional impedance-matching equipment or without replacing the existing impedance-matching equipment with new equipment. The effect of this low input impedance is to load the power source beyond its power output capability. In the case of rotating equipment, overheating of the power source may result. In the case of electronic equipment, the result may be an extreme loss in efficiency and decrease in the power output even though the power input remains high. To overcome the difficulty, the opposing walls of the fish-tail leads of the inductor block are recessed using conventional metal-machining equipment as shown in Figures 2, 3 and 4, the amount of recessing being required depending entirely upon the amount of increase in the input impedance of the inductor block necessary to effect the proper loading on the power source.

With the inductor block shown in Figures 5 to 7, it is simply necessary to adjust the position of the block 66, thereby adjusting the area of the opening 65 and effecting the desired input-impedance variation.

With the inductor of Figure 1, the high-frequency currents tend to concentrate almost entirely on the surfaces of the leads 21, 22 facing the slot 20 until they reach the opening 10 when they divide to flow around the opening but still crowded close to the surface of the opening and, thus, the currents induced in the workpiece. Because of this close spacing of the currents, opposite currents always flowing in opposite directions in the input impedance of the inductor are held to a minimum.

In operation, in accordance with the invention, the high-frequency currents flow down the fish-tail leads for a short distance in close-spaced parallel relationship. Then they divide and flow in substantial-spaced relationship about an area having no electrically-conductive material therein. Then the currents flow in close-spaced parallel relationship for a distance and then again divide to flow around the walls of the workpiece opening and induce high-frequency currents to flow in the workpiece. By dividing the current flow, the input impedance can be increased to any desired amount.

Thus, it will be seen that embodiments of the invention have been described which accomplish the objectives set forth hereinabove as well as others and which permits a method of current flow and an inductor block wherein the input impedance may be readily adjusted so that an inductor may have an optimum heating pattern on a workpiece while still providing the optimum loading on a power source.

Having thus described my invention, I claim:

1. In an inductor adapted to heat an article by high-frequency current being supplied thereto, said inductor comprising an inductor block having an opening adapted to receive the article in closely-spaced relation with a surface of the opening, a control opening adjacent to the article-receiving opening, the control opening being connected to the article-receiving opening by a relatively narrow slot and serving as means for increasing the input impedance of the inductor on the power source, and means for varying the area of the control opening whereby to change said input impedance.

2. An inductor adapted to heat an article by high-frequency current being supplied thereto, said inductor comprising two closely-spaced, substantially-complementary segments, adjacent parts of said segments having recesses cooperating to provide openings through the inductor, one of said openings being adapted to receive in closely-spaced relation an article to be heated, the other opening lying adjacent to the article-receiving opening and being adapted to regulate the input impedance of said inductor, and means for varying the size of the last said opening, said varying means comprising a movable member bridging a part of the space between the inductor segments, the movable member serving as a conductor joining parts of the segments.

3. An inductor adapted to heat an article by high-frequency current being supplied thereto, said inductor comprising two closely-spaced, substantially-complementary segments, adjacent parts of said segments having recesses cooperating to provide openings through the inductor, one of said openings being adapted to receive in closely-spaced relation an article to be heated, the other opening lying adjacent to the article-receiving opening and being adapted to regulate the input impedance of said inductor, and means for varying the size of the last said opening, said varying means comprising a current-conducting member movable along the space between the segments, and serving as means for bridging a part of the space between the segments, means for selectively positioning the bridging means to accurately control the size of the last said opening, and clamping means to deflect the aforesaid segments into current-conducting engagement with the bridging means to complete a series circuit for high-frequency heating current through the bridging means and through the segments of the inductor.

4. In an inductor adapted to heat an article by high-frequency current being supplied thereto, an article opening adapted to receive the article in closely-spaced relationship with a surface of the opening, a control opening adjacent to the article-receiving opening and having a movable wall surface, the control opening being connected to the article-receiving opening by a relatively narrow slot and serving as means for increasing the input impedance of the inductor on the power source, and means for moving the wall surface to vary the size of the control opening whereby to change said input impedance.

5. A high-frequency inductor comprising an electrically-conductive member having a workpiece-receiving opening therethrough and including a wall defining said opening with a plurality of quench openings extending into an interior passage of said member, said member also including a pair of close-spaced parallel arms having close-spaced surfaces defining a slot communicating with said workpiece opening, at least one of said surfaces being recessed with the recess void of electrically-conductive material, whereby to increase the input impedance of said inductor over that without said recess, the walls defining said recess being imperforate to the interior passage of said member.

6. The method of manufacturing a high-frequency inductor block normally having a workpiece-receiving opening and a pair of close-spaced parallel leads adapted to connect to a source of high-frequency power which comprises forming said workpiece-receiving opening to have a diameter and length such as to provide a desired heating pattern on a workpiece and subsequently adjusting the input impedance of said block by providing a recess in at least one of the close-spaced surfaces of said leads until the input impedance is increased the desired amount.

7. The method of increasing the input impedance of a high-frequency inductor having a workpiece-receiving opening of fixed and unchangeable dimensions and a pair of close-spaced parallel leads adapted to be connected to a source of high-frequency power which comprises providing a recess void of electrically-conductive material in one of the opposing surfaces of said leads, the recess having dimensions such as to increase the impedance by the desired amount.

8. The method of adjusting the loading of a high-frequency inductor on an electronic power source, the inductor having a workpiece-receiving opening and a pair of close-spaced parallel leads connected to the output terminals of an impedance-matching transformer, the transformer having a generally fixed ratio; which comprises providing a recess in at least one of the opposed surfaces of said close-spaced parallel leads of such a dimension as to reduce the loading of the inductor on the power source to the desired amount.

JAMES B. WADHAMS.

REFERENCES CITED

The following references are of record in the file of this patent:

UNITED STATES PATENTS

| Number | Name | Date |
|---|---|---|
| 2,271,916 | Denneen et al. | Feb. 3, 1942 |
| 2,353,130 | Dravneek | July 11, 1944 |
| 2,402,508 | Strickland | June 18, 1946 |